United States Patent
Chintalapati et al.

(10) Patent No.: US 12,417,308 B2
(45) Date of Patent: Sep. 16, 2025

(54) DATA PRIVACY MANAGEMENT SYSTEM AND METHOD

(71) Applicant: Truist Bank, Charlotte, NC (US)

(72) Inventors: Seshadri Chintalapati, Charlotte, NC (US); Joseph Matthew Law, Ankeny, IA (US); Josephine Middleton-Saulny, Atlanta, GA (US); Chris McClennen, Charlotte, NC (US); Phani Kumar Ankani, Atlanta, GA (US)

(73) Assignee: TRUIST BANK, Charlotte, NC (US)

(*) Notice: Subject to any disclaimer, the term of this patent is extended or adjusted under 35 U.S.C. 154(b) by 243 days.

(21) Appl. No.: 18/192,730

(22) Filed: Mar. 30, 2023

(65) Prior Publication Data

US 2024/0330503 A1    Oct. 3, 2024

(51) Int. Cl.
*G06F 21/62* (2013.01)
(52) U.S. Cl.
CPC ................. *G06F 21/6245* (2013.01)
(58) Field of Classification Search
CPC .................................................. G06F 21/6245
See application file for complete search history.

(56) References Cited

U.S. PATENT DOCUMENTS

| | | |
|---|---|---|
| 9,122,557 B1 | 9/2015 | Swerdlow |
| 11,954,225 B1* | 4/2024 | Guenther ............ G06F 21/6245 |
| 2005/0060417 A1 | 3/2005 | Rose |
| 2016/0027052 A1 | 1/2016 | Rodriguez |
| 2019/0318122 A1* | 10/2019 | Hockey ............... G06F 21/6245 |
| 2020/0159955 A1 | 5/2020 | Barlik |
| 2020/0202037 A1 | 6/2020 | Parkinson |
| 2022/0207170 A1 | 6/2022 | Poothokaran |
| 2023/0032863 A1* | 2/2023 | Bolser ................... G06F 21/604 |
| 2023/0161900 A1 | 5/2023 | Boutros |

* cited by examiner

*Primary Examiner* — Azizul Choudhury
(74) *Attorney, Agent, or Firm* — Michael A. Springs, Esq.; Shumaker, Loop & Kendrick, LLP; Patrick B. Horne

(57) ABSTRACT

A data privacy management system and method are provided. The method includes providing at least one processor, at least one memory device including readable instructions, and at least one user device in communication with the at least one processor via a network connection; receiving at least one information sharing preference and at least one communication request related to user data from a user, and transmitting the information sharing preference and/or communication request to at least one third-party entity to provide enhanced data privacy protection and control to the user.

20 Claims, 10 Drawing Sheets

New User - Registration

262 {
- First Name
- Last Name
- SSN
- Phone Number
- Email
- DOB
- Address Line
- City
- State
- Zip
- ID Document [Browse...]

Manage your preferences and information.

Sharing preferences
Choose how 3rd Party share and use your information.
[Set preferences]

Information sharing preferences — 300

Your data
See, delete, or correct your information.
[Submit a request]

Personal data requests — 400

FIG. 8

Sharing Preferences - New Request

| | |
|---|---|
| 302 — Select Preferences | ☐ Automated decision-making — 304<br>☐ Affiliate sharing — 306<br>☐ Third-party sharing — 308<br>☐ Limit use of your sensitive personal information — 310 |
| 312 — Choose Companies | ☐ Company 1  ☐ Company 2  ☐ Company 3<br>☐ Company 4  ☐ Company 5  ☐ Company 6   314<br>☐ Company 7  ☐ Company 8  ☐ Company 9<br>☐ Company 10 |
| 316 — Subscription Type | ○ One time — 318<br>○ 3 months renewal — 320<br>○ 6 months renewal — 322 |
| 324 — Subscription Fee | __ $ <br>326 |

[ Next ]

FIG. 9

Sharing Preferences - Profile Data confirmation

330

| | |
|---|---|
| Name | John Smith |
| SSN | XXX-XXX-1234 |
| Phone Number | 404-404-4004 |
| Email | email@gmail.com |
| Communication Address | 123 Main St Atlanta, GA 30308 |

[Confirm]

FIG. 10

Sharing Preferences - confirmation

Your Request is submitted successfully.

Reference Number# 789789 — 340

FIG. 11

370 Sharing Preferences - Dashboard

| Request ID | Submitted On | Request Status | Additional Details |
|---|---|---|---|
| REQ#12345 | 08/01/2020 01:00:00 PM | Submitted | Successfully submitted |

340   341   372   342   343

Click Here to submit new Sharing Preference

FIG. 12

Sharing Preferences - Request Details

| | | |
|---|---|---|
| Request ID | REQ#12345 — 340 | |
| Submitted On | 08/01/2022 01:00:00 PM — 341 | 342 |
| Request Status | Submitted | |
| Preferences Selected (302) | ☐ Automated decision-making — 304<br>☑ Affiliate sharing — 306<br>☐ Third-party sharing — 308<br>☑ Limit use of your sensitive personal information — 310 | |
| Selected Companies (312) | Company 1<br>Company 2 — 314<br>Company 3<br>Company 4 | |
| Detailed Status (346) | Name \| Status \| Tracking Number \| Submitted On<br>Company 1 \| Submitted Successfully \| 444444 \| 08/09/2022 10:00:00 AM<br>Company 2 \| Submitted Successfully \| 56789 \| 08/09/2022 02:00:00 PM<br>Company 3 \| Submitted Successfully \| 909090 \| 08/10/2022 9:30:00 AM<br>Company 4 \| Submitted Successfully \| 789789 \| 08/11/2022 3:00:00 PM | |
| Subscription Type (316) | One time — 318 | |

FIG. 13

Personal Data Request - New Request

| | |
|---|---|
| Select Request Type | ☐ See Data — 404<br>☐ Edit Data — 406<br>☐ Delete Data — 408 |
| Choose Companies | ☐ Company 1  ☐ Company 2  ☐ Company 3 — 412<br>☐ Company 4  ☐ Company 5  ☐ Company 6<br>☐ Company 7  ☐ Company 8  ☐ Company 9<br>☐ Company 10 |
| Subscription Type | ○ One time — 418<br>○ 3 months renewal — 420<br>○ 6 months renewal — 422 |
| Subscription Fee | _$ — 426 |
| Authorization Document Upload | [          ] Browse... |

402, 410, 416, 424, 428, 429

[Next]

FIG. 14

Profile Data confirmation

| Name | John Smith |
|---|---|
| SSN | XXX-XXX-1234 |
| DOB | 01/01/1985 |
| Phone Number | 404-404-4004 |
| Email | email@gmail.com |
| Communication Address | 123 Main St<br>Atlanta, GA 30308 |

430

[Confirm]

FIG. 15

DATA PRIVACY MANAGEMENT SYSTEM AND METHOD

FIELD

The invention relates generally to data privacy, and more particularly to a data privacy management system and method.

BACKGROUND

Data privacy, or information privacy, often refers to a specific kind of privacy linked to personal information that is provided from individuals to private enterprises in a variety of different applications. Currently, protections for personal information are sector-specific, including personal health information, educational information, children's information, and financial information, and each has different enforcement mechanisms and unique requirements on consent and disclosure. However, data privacy is ever-evolving in how personal information is used and how it is regulated. The future of data privacy will likely require greater protections and more affirmative rights for individuals.

Accordingly, it would be desirable to develop a data privacy management system and method that provides enhanced data privacy protection and control.

BRIEF SUMMARY

In concordance and agreement with the present invention, a data privacy management system and method that provides enhanced data privacy protection and control, have been newly designed.

In one embodiment, a system for managing data, the system comprises: a computing system including at least one processor and at least one memory device, wherein the computing system executes computer-readable instructions; and a network connection operatively connecting the computing system to at least one user device; wherein, upon execution of the computer-readable instructions, the at least one processor is configured to: receive at least one information sharing preference related to user data; and transmit the at least one information sharing preference to at least one third-party entity to selectively control use of the user data by the at least one third-party entity.

In another embodiment, a method for managing data, comprising the steps of: providing at least one processor, at least one memory device including readable instructions, and at least one user device in communication with the at least one processor via a network connection; receiving at least one information sharing preference related to user data; and transmitting the at least one information sharing preference to at least one third-party entity to selectively control use of the user data by the at least one third-party entity.

As aspects of some embodiments, the at least one information sharing preference is related to at least one of a marketing preference and a data sharing preference.

As aspects of some embodiments, the at least one information sharing preference is related to automated decision-making.

As aspects of some embodiments, the at least one information sharing preference is related to affiliate sharing.

As aspects of some embodiments, the at least one information sharing preference is related to third-party sharing.

As aspects of some embodiments, the at least one information sharing preference is related to limiting use of sensitive personal information.

As aspects of some embodiments, the at least one information sharing preference is selected by a user from a plurality of information sharing preferences provided by the system.

As aspects of some embodiments, the at least one third-party entity is selected by a user from a plurality of third-party entities provided by the system.

As aspects of some embodiments, the at least one information sharing preference is received from a data privacy application.

As aspects of some embodiments, the data privacy application is a subscription based application.

In another embodiment, a system for managing data, the system comprises: a computing system including at least one processor and at least one memory device, wherein the computing system executes computer-readable instructions; and a network connection operatively connecting the computing system to at least one user device; wherein, upon execution of the computer-readable instructions, the at least one processor is configured to: receive at least one communication request related to user data; connect with at least one third-party entity; collect usage data of the user data from the at least one third-party entity; and transmit the usage data of the user data by the at least one third-party entity to a user.

In yet another embodiment, a method for managing data, comprises the steps of: providing at least one processor, at least one memory device including readable instructions, and at least one user device in communication with the at least one processor via a network connection; receiving at least one communication request related to user data; connecting with at least one third-party entity; collecting usage data of the user data from the at least one third-party entity; and transmitting the usage data of the user data by the at least one third-party entity to a user.

As aspects of some embodiments, the at least one processor is further configured to receive identification documentation of the user via an application accessible by the at least one user device.

As aspects of some embodiments, the at least one processor is further configured to verify identification documentation of the user of via an application accessible by the at least one user device.

As aspects of some embodiments, the at least one processor is further configured to filter the usage data prior to transmission to the user.

As aspects of some embodiments, the at least one communication request is received via an application accessible by the at least one user device.

As aspects of some embodiments, the at least one communication request is received via a graphical user interface of an application accessible by the at least one user device.

As aspects of some embodiments, the at least one communication request is received by at least one agent of an enterprise system.

As aspects of some embodiments, the at least one communication request is a request to at least one of view data, edit data, and delete data.

As aspects of some embodiments, the usage data is hosted on an application accessible by the at least one user device.

As aspects of some embodiments, the at least one third-party entity is selected by a user from a plurality of third-party entities provided by the system.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

The above-mentioned, and other features and objects of the inventions, and the manner of attaining them will become more apparent and the invention itself will be better understood by reference to the following description of embodiments of the invention taken in conjunction with the accompanying drawings, wherein:

FIGS. 4-18 are graphical illustrations showing displays of a graphical user interface during use of the data privacy management system and method of FIGS. 1-3, respectively.

DETAILED DESCRIPTION

Figure 1:
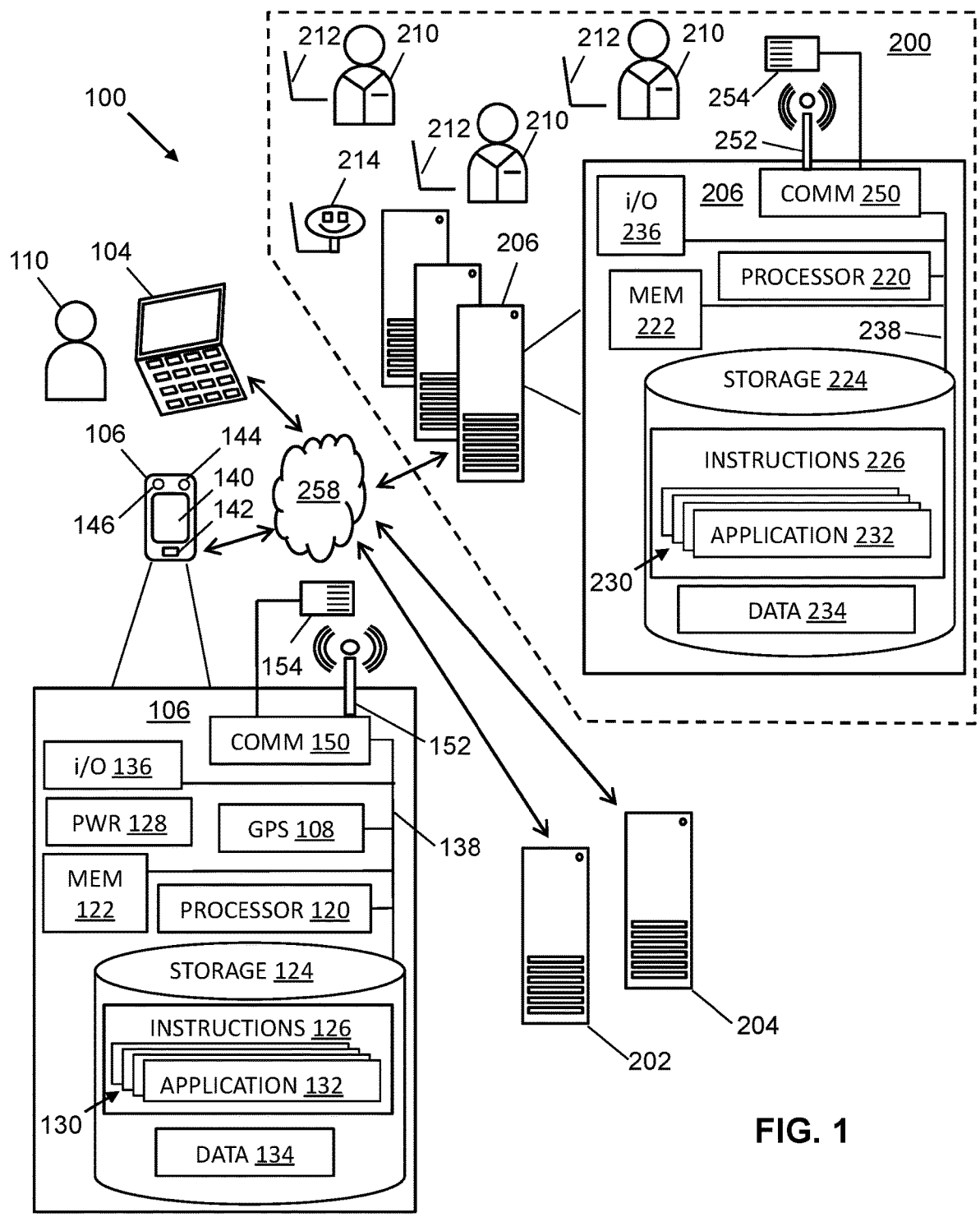
FIG. 1 is a schematic diagram illustrating an enterprise system and environment thereof for implementing a data privacy management system and method in accordance with an embodiment of the presently described subject matter.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Operations of the method, and combinations of operation in the method, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the method.

Figure 2:
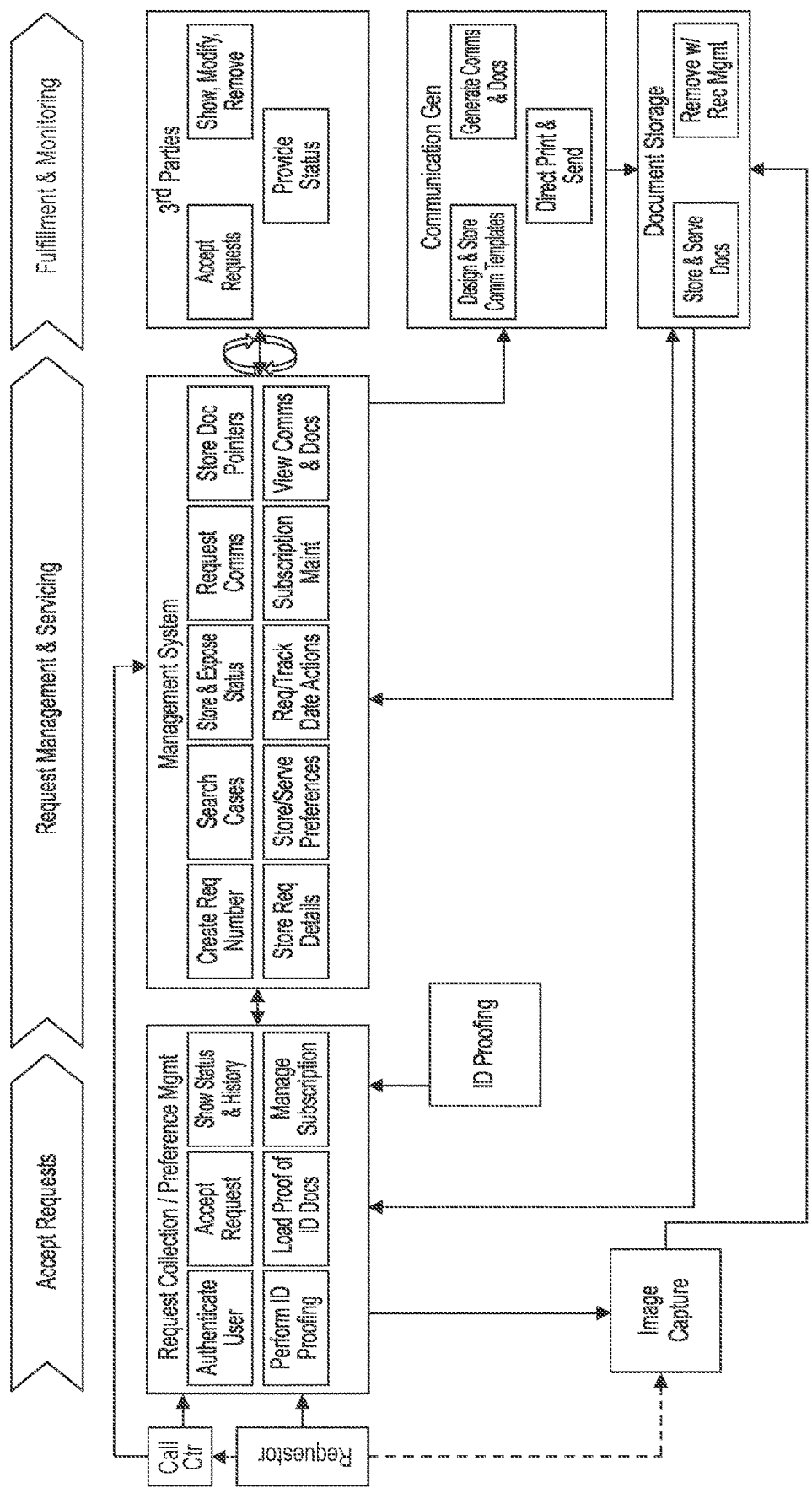
FIG. 2 is a diagram illustrating a high-level process flow of the data privacy management system and method of FIG. 1.
Figure 3:
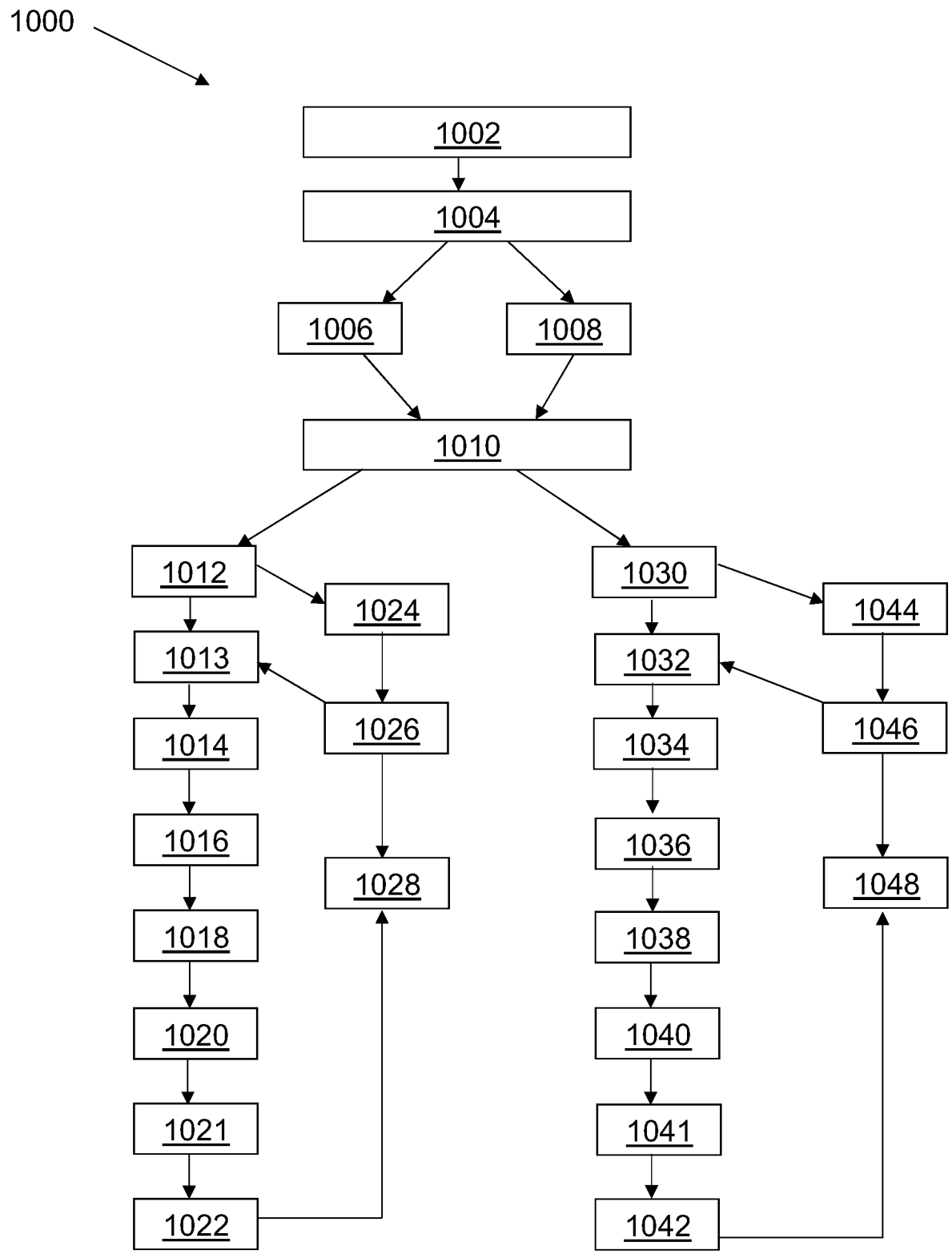
FIG. 3 is a flow diagram illustrating a method for managing privacy preferences and data requests.

One of the programs 230 of the enterprise system 200 may be a data privacy application 232. A high-level process flow diagram of the data privacy management system and method of FIG. 1 that utilizes the data privacy application 232 is depicted in FIG. 2. The data privacy application 232 may be used by an enterprise to provide the users 110 with increased transparency, control, and insights into use and protection of their personal information. FIG. 3 is a flow diagram depicting an exemplary method 1000 for managing data privacy in accordance with an embodiment of the present disclosure. The method 1000 depicted may be executed by an application of a system, for example, the data privacy application 232 of the enterprise system 200 of FIG. 1. In an example embodiment, the data privacy application 232 may be accessed and/or executed via a computing device, for example, the user device (referring to either or both of the computing device 104 and the mobile device 106) of FIG. 1. It is understood that the data privacy application 232 may be a subscription-based application.

Figure 4:
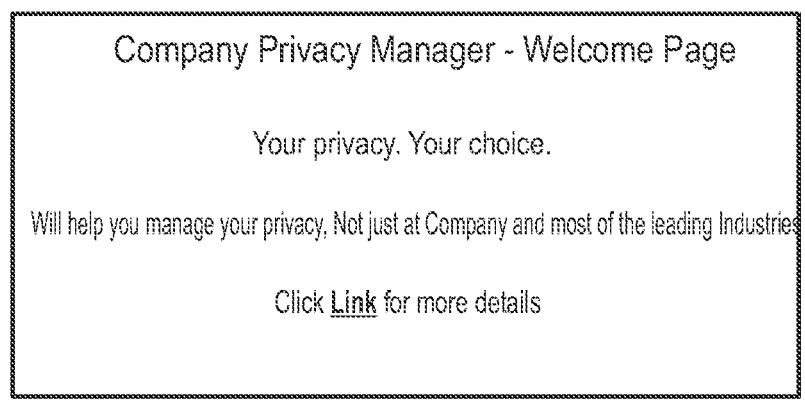
Figure 5:
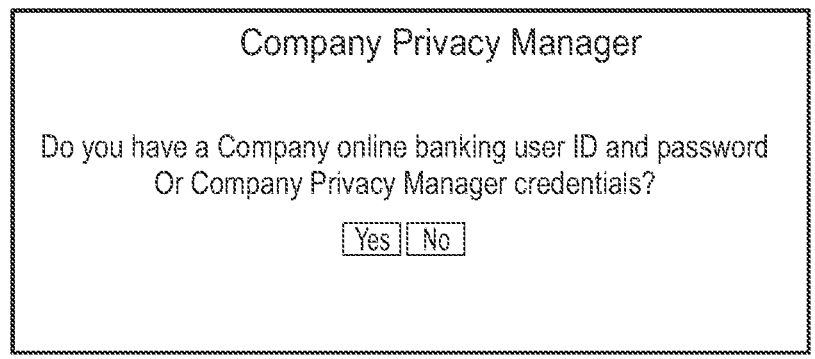
Figure 6:
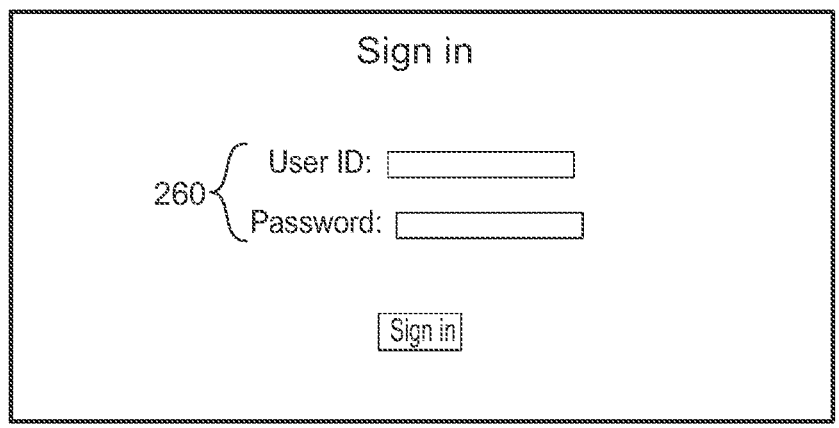

In step 1002 of the method 1000 shown in FIG. 3, the user 110 executes the data privacy application 232 using the user device (referring to either or both of the computing device 104 and the mobile device 106). An initial landing page of the data privacy application 232 provided on the display 140, via the GUI, is shown in FIG. 4. In step 1004, the user 110 selects, via the GUI, whether to log into the data privacy application 232 as an authenticated online banking/privacy data management system user or as an unauthenticated user. See FIG. 5. To proceed when the user 110 is authenticated, the user 110, in step 1006, inputs credentials into the data privacy application 232, via the GUI. An example of an input credentials screen of the GUI of the data privacy application 232 is shown in FIG. 6. Various credentials 260 may be required such a username and a password in order to further access the data privacy application 232. Alternatively, to proceed when the user 110 is unauthenticated, the user 110, in step 1008, inputs personally identifiable information (PII) data 262 (e.g., first name, last name, social security number, telephone number, email, date of birth, address, city, state, zip code, identification document number, and the like), via the GUI, into the data privacy application 232. An example of an input PII data screen of the GUI of the data privacy application 232 is shown in FIG. 7.

At step 1010, the user 110 may select an information sharing preferences feature 300 and/or a personal data request (PDR) feature 400 for personal data of the user 110 from a data management screen, via the GUI. An example of the data management screen of the data privacy application 232 is shown in FIG. 8. In some embodiments, the information sharing preferences feature 300 allows the user 110 to set desired preferences to control access and/or use of the personal data of the user 110 by one or more third-party entities 314. The PDR feature 400 is a request by the user 110 to view, delete, and/or correct the personal data of the user 110 that has been collected and/or stored with one or more third-party entity.

The personal data may include sensitive data and domain specific data. Herein, the personal data may refer to data that may be utilized for determining identity of the user 110. Examples of the personal data in case of the data privacy application 232 may include permanent account numbers, date of birth, e-mail address, residential address, and mobile numbers, for example. The personal data may also include data that can pose a risk or affect the user 110 financially or otherwise, if disclosed in public. In an embodiment, the personal data may include domain specific fields, and can be generated by the enterprise system 200. Examples of the personal data for a financial institution such as a bank may include financial information such as debit and/or credit card numbers, CVV number, account balance, card expiry date, and other such fields, for example. The personal data may be provided by various data sources of the third-party entities to the data privacy application 232.

When the user 110 desires to limit and/or control the personal data accessed and/or used by one or more third-party entities 314, the information sharing preferences feature 300 of the privacy data application 232 is initiated, via the GUI, in step 1012. In circumstances when the user 110 has not previously set the information sharing preferences, the user 110 is prompted to initiate a new quest at step 1013. An example of a new request screen of the GUI of the data privacy application 232 is shown in FIG. 9. The user 110, in step 1014, first selects which information sharing preferences 302 provided by the data privacy application 232, via the GUI, are desired. Since the data privacy application 232 and/or the enterprise system 200 is extensible and flexible, the information sharing preferences 302 defined herein are not static preferences, and can be updated by adding new preferences and/or deleting the existing preferences, or replacing preferences with the new preferences.

In some embodiments, the information sharing preferences 302 are independent of the user 110 and/or the third-party entities 314 selected in step 1016 described hereinafter. In other embodiments, the information sharing preferences 302 may be dependent and associated with a specific user 110 and/or the third-party entities 314 selected in step 1016. Various information sharing preferences 302 may include, but are not limited to, automated decision-making 304, affiliate sharing 306, third-party sharing 308, and/or limit use of your sensitive personal information 310, for example. The new request screen of the GUI of the data privacy application 232 may further include a text box configured to receive an unlisted sharing preference. The automated decision-making preference 304 indicates that the third-party entities 314 are not to have human interaction with the user 110 and use artificial intelligence in all decisions related to processes of the third-party entities 314. In some instances, the affiliate sharing 306 controls the personal data shared with affiliates of the third-party entities 314. The third-party sharing 308 controls the personal data shared with third-party associates of the third-party entities 314. In certain circumstances, the limit use of sensitive personal information 310 controls the use of the sensitive personal information of the user 110 by the third-party entities 314.

Then, at step 1016, the user 110 may choose companies 312 by selecting one or more of the third-party entities 314 that the user 110 desires to control access to and/or use of the personal data. In some embodiments, the third-party entities 314 listed are independent of the user 110 and/or the information sharing preferences 302. In other embodiments, the third-party entities 314 may be dependent on and associated with a specific user 110 and/or the information sharing preferences 302 selected in step 1014. The third-party entities 314 may include, but are not limited to, the ones shown on the request screen of the GUI of the data privacy application 232. In some embodiments, one or more of the third-party entities 314 may be a financial institution such as a bank, for example. The new request screen of the GUI of the data privacy application 232 may further include a text box configured to receive an identity of an unlisted third-party entity.

At step 1018, the user 110 then selects which of subscription types 316 provided by the data privacy application 232, via the GUI, is desired. In some embodiments, the subscription types 316 are independent of the user 110, the sharing preferences 302, and/or the third-party entities 314 selected in steps 1014 and 1016. In other embodiments, the subscription types 316 may be dependent and associated with a specific user 110, the information sharing preferences 302 selected, and/or the third-party entities 314 selected in steps 1014 and 1016. Various subscription types 316 may include, but are not limited to, one-time 318, three months 320, and six months 322, for example. Upon selection of one of the subscription types 316 by the user 110, an amount 326 of a subscription fee 324 is displayed, via the GUI, of the data privacy application 232.

As depicted in FIG. 9, each of the sharing preferences 304, 306, 308, 310 and the third-party entities 314 may be associated with an individual check box and each of the subscription types 318, 320, 322 may be associated with a radio button. It is understood, however, that various other types of control element or means of selection may be employed such as a drop-down list, for example.

Once the information sharing preferences 302, the third-party entities 314, and the subscription type 316 have been selected, a review of a profile data 330 of the user 110 may be requested at step 1020. An example of a review screen of the GUI of the data privacy application 232 is shown in FIG. 10. In some instances, the review screen may further include an update/edit feature (not depicted) for the user 110 to modify the profile data 330 if desired. Upon reviewing the profile data 330, the user 110 submits the information sharing preferences 302, the third-party entities 314, the subscription type 316, and the subscription fee 324 and confirms the profile data 330 at step 1021. Thereafter, in step 1022, the user 110 receives confirmation that an information sharing preference request, including the information sharing preferences 302, the third-party entities 314, the subscription type 316, and the subscription fee 324, has been submitted. An example of a confirmation screen of the GUI of the data privacy application 232 is shown in FIG. 11. In some instances, the conformation screen of the data privacy application 232 provides a reference number/request identification number (ID) 340 for the information sharing preference request submission.

In some instances when the user 110 has previously submitted a new request via steps 1013-1022, a personal dashboard, as shown in FIG. 12, may be provided to the user 110, at step 1024, instead of the new request screen when the information sharing preferences feature 300 of the privacy data application 232 is initiated, via the GUI, in step 1012. The personal dashboard may display the previously submitted information sharing preference requests. Various request identifiers 370 may be provided for each of the information sharing preference requests such as the reference number/request ID 340, a date and/or time of the submission 341, a request status 342 (e.g., submitted, closed, complete, etc.), and/or additional details 343, for example. At least one of the request identifiers 370 may be a link to further information related to a specific information sharing preference request. As a non-limiting example, when one of the request identifiers 370 (e.g., the reference number/request ID) is selected by the user 110, at step 1026, one or more details of the specific information sharing preference request are displayed, via the GUI, on a request detail screen. An example of a request detail screen of the GUI is shown in FIG. 13. In some embodiments, the request detail screen may include the reference number/request ID 340, the date and/or time of the submission 341, the request status 342, the selected information sharing preferences 302, the selected third-party entities 314, the detailed status 346, and the subscription type 316. It is understood that the request detail screen may include more or less details than shown in FIG. 13. Additionally, the personal dashboard may further include a link 372 to the new request screen of the data privacy application 232 if the user 110 desires to submit a new request via steps 1013-1022. It is understood that at least one of the reference number/request ID 340, the date and/or time of the submission 341, the request status 342, the selected information sharing preferences 302, the selected third-party entities 314, the detailed status 346, and the subscription type 316 may be stored as user data 234 or other data in the storage device 224 of the enterprise system 200. At step 1028, the user 110 may then close the information sharing preferences feature 300 and return to the data management screen of the data privacy application 232 to manage other preferences and data, and/or logout of the data privacy application 232.

In certain embodiments, once the information sharing preferences 302 for the selected third-party entities 314 are submitted, the data privacy application 232 and/or the enterprise system 200 may transmit the information sharing preferences 302 to one or more agents 210 via the network 258. The data privacy application 232 and/or the enterprise system 200 may then connect and/or communicate with the selected third-party entities 314 to limit and/or control the personal data accessed and/or used by one or more or the selected third-party entities 314. In some instances, the one or more agents 210 of the enterprise system 200 may utilize the network 258 and/or one or more application programing interfaces (APIs) to manage the information sharing preferences 302 of the selected third-party entities 314 to limit and/or control the personal data of the user 110 being accessed and used the third-party entities 314. The one or more agents 210 may receive at least one communication and/or confirmation from the selected third-party entities 314 that the information sharing preferences 302 have been submitted and/or confirmed.

When the user 110 desires to view, delete, and/or correct the personal data of the user 110 that has been collected and/or stored with one or more third-party entity, the PDR feature 400 of the privacy data application 232 is initiated, via the GUI, in step 1030. In circumstances when the user 110 has not previously made a personal data request (PDR), the user 110 is prompted to initiate a new PDR at step 1032. An example of a new request screen of the GUI of the data privacy application 232 is shown in FIG. 14. The user 110, in step 1034, first selects which of request types 402 provided by the data privacy application 232, via the GUI, are desired. In some embodiments, the request types 402 are independent of the user 110 and/or the third-party entities 412 selected in step 1036 described hereinafter. In other embodiments, the request types 402 may be dependent on and associated with a specific user 110 and/or the third-party entities 412 selected in step 1036. Various request types 402 may include, but are not limited to, see/view data 404, edit data 406, and/or delete data 408, for example. The new request screen of the GUI of the data privacy application 232 may further include a text box configured to receive an unlisted request type.

Then, at step 1036, the user 110 may choose companies 410 by selecting one or more of the third-party entities 412 that the user 110 desires to see/view, edit, and/or delete the personal data. In some embodiments, the third-party entities 412 listed are independent of the user 110 and/or the request types 402. In other embodiments, the third-party entities 412 may be dependent on and associated with a specific user 110 and/or the request types 402 selected in step 1034. The third-party entities 412 may include, but are not limited to, various third-party entities 412 shown in the new request screen of the GUI of the data privacy application 232. In some embodiments, one or more of the third-party entities 412 may be a financial institution such as a bank, for example. The new request screen of the GUI of the data privacy application 232 may further include a text box configured to receive an identity of an unlisted third-party entity.

At step 1038, the user 110 then selects which of subscription types 416 provided by the data privacy application 232, via the GUI, is desired. In some embodiments, the subscription types 416 are independent of the user 110, the request types 402, and/or the third-party entities 412 selected in steps 1034 and 1036. In other embodiments, the subscription types 416 may be dependent on and associated with a specific user 110, the request types 402 selected, and/or the third-party entities 412 selected in steps 1034 and 1036. Various subscription types 416 may include, but are not limited to, one-time 418, three months 420, and six months 422, for example. Upon selection of one of the subscription types 416 by the user 110, an amount 426 of a subscription fee 424 is displayed, via the GUI, of the data privacy application 232.

Authorization document upload 428 may be provided to submit user identification documentation to the data privacy application 232, via a control element 429 of the GUI, at step 1040. The control element 430 may include a browse feature that permits a search of the files of the user device (referring to either or both of the computing device 104 and the mobile device 106). In some embodiments, the data privacy application 232 may determine whether the user identification documentation is required to be submitted. If yes, the data privacy application 232 may transmit a request for such documentation. Upon submission of the user identification documentation may be examined for legality. If the submitted user identification documentation is determined to be legally insufficient, a communication containing notification of the decline of the user identification documentation may be transmitted to the user 110. It is understood that the communication containing the notification of the decline of the user identification documentation may be automatically generated. Conversely, if the submitted user identification documentation is determined to be legally sufficient, the data privacy application 232 proceeds.

As depicted in FIG. 14, each of the request types 404, 406, 408, and the third-party entities 412 may be associated with an individual check box and each of the subscription types 418, 420, 422 may be associated with a radio button. It is understood, however, that various other types of control element or means of selection may be employed such as a drop-down list, for example.

Figure 16:
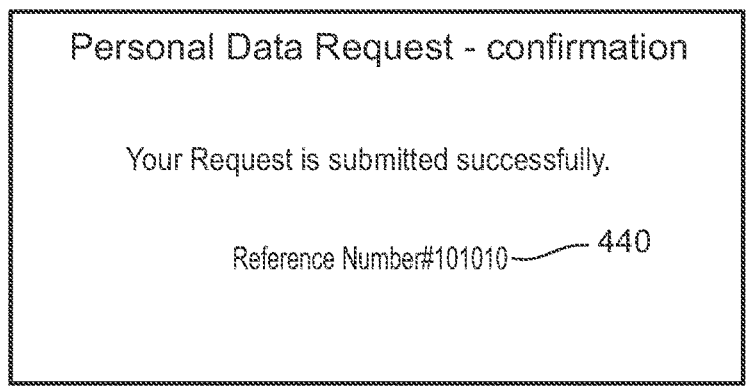

Once the request types 402, the third-party entities 412, and the subscription type 416 have been selected, a review of a profile data 430 of the user 110 may be requested at step 1040. An example of a review screen of the GUI of the data privacy application 232 is shown in FIG. 15. In some instances, the review screen may further include an update/edit feature (not depicted) for the user 110 to modify the profile data 430 if desired. Upon reviewing the profile data 430, the user 110 submits the request types 402, the third-party entities 412, the subscription type 416, and the subscription fee 424 and confirms the profile data 430 at step 1041. Thereafter, in step 1042, the user 110 receives confirmation that the new PDR, including the request type 402, the third-party entities 412, the subscription type 416, and the subscription fee 424, has been submitted. An example of a confirmation screen of the GUI of the data privacy application 232 is shown in FIG. 16. In some instances, the conformation screen of the data privacy application 232 provides a reference number/request identification number (ID) 440 for the PDR.

Figure 17:
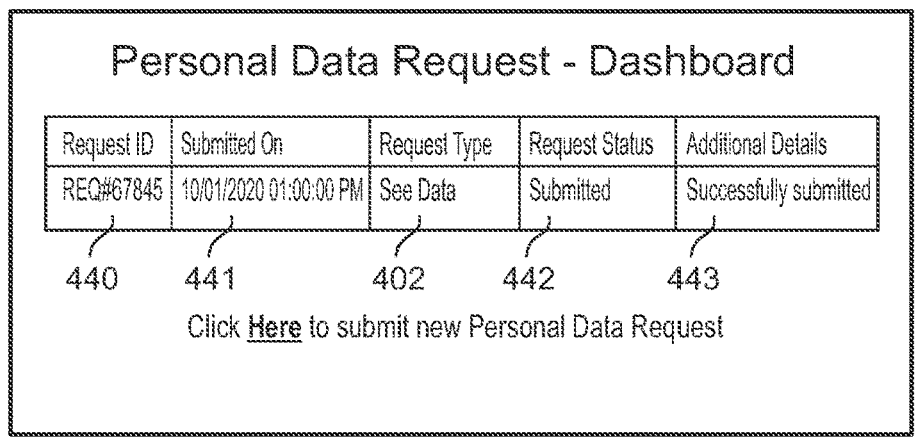
Figure 18:
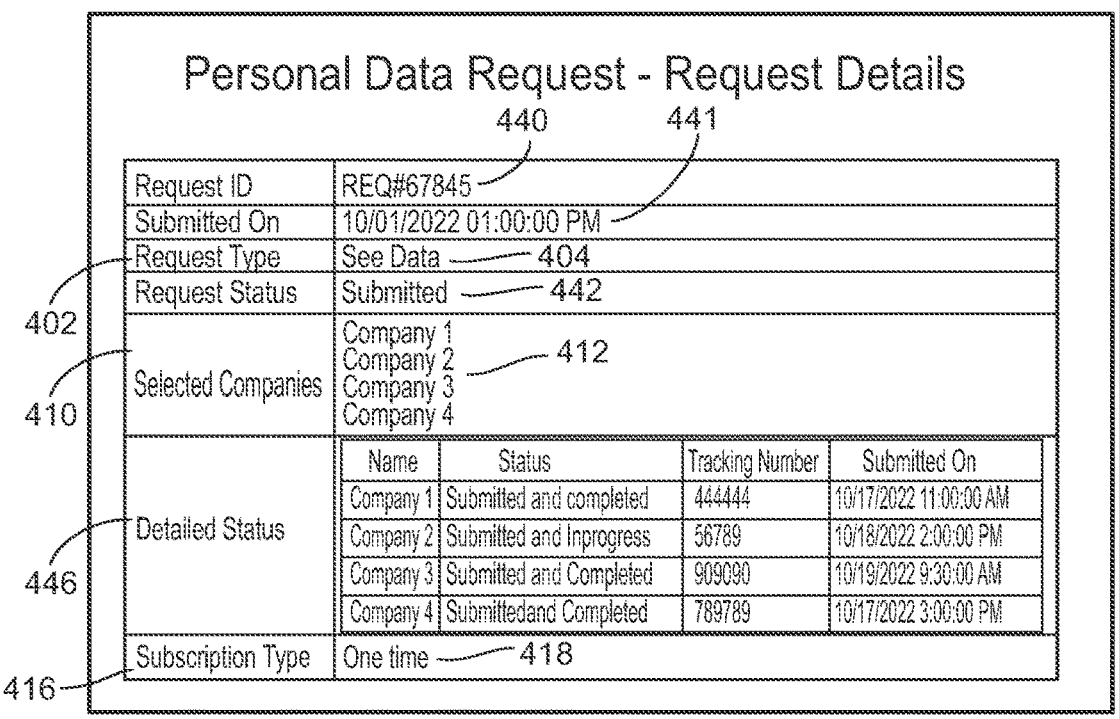

In some instances when the user 110 has previously submitted a new PDR via steps 1032-1042, a personal dashboard, as shown in FIG. 17, may be provided to the user 110, at step 1044, instead of the new request screen when the PDR feature 400 of the privacy data application 232 is initiated, via the GUI, in step 1030. The personal dashboard may display the previously submitted PDRs. Various request identifiers 470 may be provided for each of the PDRs such as the reference number/request ID 440, a date and/or time of the submission 441, the selected request type 402, a request status 442 (e.g., submitted, closed, complete, etc.), and/or additional details 443, for example. At least one of the request identifiers 470 may be a link to further information related to a specific PDR. As a non-limiting example, when one of the request identifiers 470 (e.g., the reference number/request ID) is selected by the user 110, at step 1046, one or more details of the specific PDR are displayed, via the GUI, on a request detail screen. An example of a request detail screen of the GUI is shown in FIG. 18. In some embodiments, the request detail screen may include the reference number/request ID 440, the date and/or time of the submission 441, the selected request type 402, the request status 442, the selected third-party entities 412, the detailed status 446, and the subscription type 416. It is understood that the request detail screen may include more or less details than shown in FIG. 18. It is further understood that at least one of the reference number/request ID 440, the date and/or time of the submission 441, the selected request type 402, the request status 442, the selected third-party entities 412, the detailed status 446, and the subscription type 416 may be stored as user data 234 or other data in the storage device 224 of the enterprise system 200.

In some embodiments, when the PDR has been submitted, the data privacy application 232 commences a collection of the personal data from the third-party entities 412. The personal data collection may be conducted by the data privacy application 232 via one or more application programing interfaces (APIs). In some instances, the third-party entities 412 may transmit the collected personal data to the data privacy application 232. The collected personal data may be filtered by the data privacy application 232. In certain embodiments, the collected personal data may be compared to predetermined rules and/or criteria to delete unnecessary and/or undesired segments of the personal data. The filtered personal data may be transformed by the data privacy application 232 into a communication (e.g., an electronic file) containing usage data of the filtered personal data. The communication containing the usage data of the filtered personal data may be reviewed for quality assurance by the data privacy application 232. When the communication containing the usage data of the filtered personal data does not meet quality assurance standards, a notification with concerns is transmitted to at least one of the agents 210 of the enterprise system 200. Thereafter, the collected personal data may be further filtered to address the concerns provided in the notification transmitted. The filtering process may be repeated until the communication containing the usage data of the filtered personal data meets the quality assurance standards. When the communication containing the usage data of the filtered personal data meets the quality assurance standards, the communication containing the usage data of the filtered personal data may then be provided and/or hosted on the personal dashboard of the user 110 by the privacy data application 232. Additionally, the personal dashboard may further include a link 472 to the new request screen of the data privacy application 232 if the user 110 desires to submit a new PDR via steps 1032-1042. At step 1048, the user 110 may then close the PDR feature 400 and return to the data management screen of the data privacy application 232 to manage other PDRs, and/or logout of the data privacy application 232.

The data privacy application 232 may be a mechanism to provide the users 110 with transparency into the personal data of the user 110 collected by the third-party entities 412 and how it is used as well as an understanding of how privacy and security are handled. The data privacy application 232 will enable compliance with regulatory requirements, build trust and secure market share, enabling a broader, more dynamic use of the personal data of the user 110. More importantly, the data privacy application 232 provides a positive user experience. Features of the data privacy application 232 are expandable as user expectations and privacy regulations evolve over time.

The use of the data privacy application 232 improves the efficiency of the human agents 210 and operation of the computing system 206 in various different respects. First, the disclosed method eliminates unnecessary time, effort, and communications relating to certain tasks performed by the human agents 210 and/or the computing system 206 that have been found to not have a positive impact on securing desired product and/or services from the users 110 and/or securing the usage data for the personal data of the user 110 from the various third-party entities 412. This may be especially relevant where extensive costs can be avoided by sending communication of various forms to correct users 110, as well as verifying requestor credentials and filtering the personal data of the user 110 prior to transmittal of any communication. This results in the human agents 210 and the computing system 206 avoiding a waste of resources when performing certain tasks, such as sending unwanted communications to users 110 that will never interact with or benefit from communications from the enterprise system 200. Second, the use of the data privacy application 232 also allows for certain variables in the personal data of the user 110 to be determined to be private and further allows for the computing system 206 to be simplified by means of the elimination of undesired interactions. Third, the data privacy application 232 provides greater insight to the users 110 with respect to usage of their personal data by the third-party entities 412. Each of the described advantages reduces network traffic as experienced by the computing system 206 due to the ability to manage data privacy of the user 110 via the data privacy application 232 via the GUI.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A system for managing data, the system comprising:
a computing system including at least one processor and at least one memory device, wherein the computing system executes computer-readable instructions; and
a network connection operatively connecting the computing system to at least one user device;
wherein, upon execution of the computer-readable instructions, the at least one processor is configured to:
receive, from the at least one user device, an indication to initiate setting third-party sharing preferences associated with sharing user data, the indication being received via a data management screen of a data privacy application;
transmit one or more control signals to the data privacy application to initiate display of an interface for modifying the third-party sharing preferences, the interface including inputs for (a) modifying sharing preferences for sharing the user data, (b) a plurality of companies to which sharing of the user data is to be controlled, (c) a subscription type that is provided via the data privacy application, where the subscription type is associated with a frequency or duration for which services associated with the sharing preferences are provided via the data privacy application, and (d) a field that displays a subscription fee that is associated with the subscription type once the subscription type is selected;
receive, from the at least one user device, at least one communication request related to the sharing preferences for sharing the user data, wherein the at least one communication request indicates that the sharing preferences include one or more selections from a plurality of selectable sharing preferences, wherein the plurality of selectable sharing preferences are respectively associated with (i) automated decision-making preferences indicating whether one or more third-party entities are to have human interaction with a user associated with the user data, (ii) preferences for sharing the user data with affiliates of the one or more third-party entities, (iii) preferences for sharing the user data with the one or more third-party entities, and (iv) use of sensitive personal information preferences, wherein the one or more third-party entities are selected from the plurality of companies;
connect with one or more third-party data sources of at least one third-party entity of the one or more third-party entities to which the user data is shared, the one or more third-party data sources including usage data about how the at least one third-party entity used the user data;
collect the usage data of the user data from the one or more third-party data sources of the at least one third-party entity; and
transmit the usage data of the user data associated with the at least one third-party entity to the at least one user device of the user.

2. The system of claim 1, wherein the at least one processor is further configured to receive identification documentation of the user via the data privacy application.

3. The system of claim 1, wherein the at least one processor is further configured to verify identification documentation of the user of via the data privacy application.

4. The system of claim 1, wherein the at least one processor is further configured to filter the usage data prior to transmission to the at least one user device of the user.

5. The system of claim 1, wherein the at least one communication request is received via the data privacy application.

6. The system of claim 1, wherein the at least one communication request is received via a graphical user interface of the at least one user device during use of the data privacy application.

7. The system of claim 1, wherein the at least one communication request is received by at least one agent device of an agent of an enterprise system.

8. The system of claim 1, wherein the at least one communication request includes a request controlling how the usage data is to be used based on selection of an input to perform at least one of view data, edit data, and delete data.

9. The system of claim 1, wherein the usage data is hosted on the data privacy application.

10. The system of claim 1, wherein the at least one third-party entity is selected by the user from the plurality of companies provided by the system.

11. A method for managing data, the method comprising:
receiving, from at least one user device, an indication to initiate setting third-party sharing preferences associated with sharing user data, the indication being received via a data management screen of a data privacy application;
transmitting one or more control signals to the data privacy application to initiate display of an interface for modifying the third-party sharing preferences, the interface including inputs for (a) modifying sharing preferences for sharing the user data, (b) a plurality of companies to which sharing of the user data is to be controlled, (c) a subscription type that is provided via the data privacy application, where the subscription type is associated with a frequency or duration for which services associated with the sharing preferences are provided via the data privacy application, and (d) a field that displays a subscription fee that is associated with the subscription type once the subscription type is selected;

receiving, from the at least one user device, at least one communication request related to the sharing preferences for sharing the user data, wherein the at least one communication request indicates that the sharing preferences include one or more selections from a plurality of selectable sharing preferences, wherein the plurality of selectable sharing preferences are respectively associated with (i) automated decision-making preferences indicating whether one or more third-party entities are to have human interaction with a user associated with the user data, (ii) preferences for sharing the user data with affiliates of the one or more third-party entities, (iii) preferences for sharing the user data with the one or more third-party entities, and (iv) use of sensitive personal information preferences, wherein the one or more third-party entities are selected from the plurality of companies;

connecting with one or more third-party data sources of at least one third-party entity of the one or more third-party entities to which the user data is shared, the one or more third-party data sources including usage data about how the at least one third-party entity used the user data;

collecting the usage data of the user data from the one or more third-party data sources of the at least one third-party entity; and transmitting the usage data of the user data associated with the at least one third-party entity to the at least one user device of the user.

12. The method of claim 11, wherein the method further includes receiving identification documentation of the user via the data privacy application.

13. The method of claim 11, wherein the method further includes verifying identification documentation of the user of the data privacy application.

14. The method of claim 11, wherein the method further includes filtering the usage data prior to transmission to the at least one user device of the user.

15. The method of claim 11, wherein the at least one communication request is received via the data privacy application.

16. The method of claim 11, wherein the at least one communication request is received via a graphical user interface of the at least one user device during use of the data privacy application.

17. The method of claim 11, wherein the at least one communication request is received by at least one agent device of an agent of an enterprise system.

18. The method of claim 11, wherein the at least one communication request includes a request controlling how the usage data is to be used based on selection of an input to perform at least one of view data, edit data, and delete data.

19. The method of claim 11, wherein the usage data is hosted on the data privacy application.

20. The method of claim 11, wherein the at least one third-party entity is selected by the user from the plurality of companies provided by the system.

* * * * *